(12) United States Patent
Vendrow

(10) Patent No.: US 8,452,864 B1
(45) Date of Patent: *May 28, 2013

(54) NETWORK RESOURCE DEPLOYMENT FOR CLOUD-BASED SERVICES

(71) Applicant: RingCentral, Inc., San Mateo, CA (US)

(72) Inventor: Vlad Vendrow, Redwood Shores, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,138

(22) Filed: Nov. 14, 2012

Related U.S. Application Data

(63) Continuation of application No. 13/418,181, filed on Mar. 12, 2012, now Pat. No. 8,335,851.

(51) Int. Cl.
*G06F 15/173* (2006.01)

(52) U.S. Cl.
USPC ........... 709/223; 709/226; 709/201; 709/203; 718/105; 718/106; 700/99; 705/7.12; 77/999.205; 710/56

(58) Field of Classification Search
USPC ............... 709/223, 226, 201, 203; 710/56; 707/999.25; 705/7.12; 700/99; 718/105, 106
See application file for complete search history.

(56) References Cited

U.S. PATENT DOCUMENTS

| | | | |
|---|---|---|---|
| 6,335,733 B1 * | 1/2002 | Keren et al. | 345/418 |
| 6,338,088 B1 * | 1/2002 | Waters et al. | 709/226 |
| 6,418,445 B1 * | 7/2002 | Moerbeek | 1/1 |
| 6,496,858 B1 * | 12/2002 | Frailong et al. | 709/221 |
| 6,553,367 B2 | 4/2003 | Horovitz et al. | |
| 7,043,324 B2 | 5/2006 | Woehler | |
| 7,099,938 B2 * | 8/2006 | Hermann et al. | 709/224 |
| 7,146,234 B2 * | 12/2006 | Woehler | 700/107 |
| 7,353,464 B1 * | 4/2008 | Kundu et al. | 715/853 |
| 7,415,671 B2 | 8/2008 | Sylor et al. | |
| 7,526,542 B2 * | 4/2009 | Booman et al. | 709/223 |
| 7,574,496 B2 * | 8/2009 | McCrory et al. | 709/223 |
| 7,596,620 B1 * | 9/2009 | Colton et al. | 709/226 |
| 7,627,658 B2 * | 12/2009 | Levett et al. | 709/223 |
| 7,761,493 B1 * | 7/2010 | Markel et al. | 707/797 |
| 7,904,540 B2 | 3/2011 | Hadad et al. | |
| 7,941,438 B2 * | 5/2011 | Molina-Moreno et al. | 707/756 |
| 8,000,451 B1 * | 8/2011 | Aubuchon et al. | 379/15.03 |
| 8,024,219 B2 * | 9/2011 | Woehler | 705/7.31 |
| 8,028,250 B2 * | 9/2011 | Vronay et al. | 715/853 |
| 8,200,720 B2 * | 6/2012 | Harada | 707/821 |
| 8,201,189 B2 * | 6/2012 | Semerdzhiev et al. | 719/320 |
| 2002/0091681 A1 * | 7/2002 | Cras et al. | 707/3 |
| 2002/0095430 A1 * | 7/2002 | Egilsson et al. | 707/104.1 |
| 2002/0138469 A1 * | 9/2002 | Horovitz et al. | 707/2 |
| 2002/0186238 A1 * | 12/2002 | Sylor et al. | 345/736 |
| 2003/0120710 A1 * | 6/2003 | Pulsipher et al. | 709/106 |

(Continued)

OTHER PUBLICATIONS

US Office Action mailed Jun. 8, 2012, issued in U.S. Appl. No. 13/418,181.

(Continued)

*Primary Examiner* — Alina N Boutah
(74) *Attorney, Agent, or Firm* — Weaver Austin Villeneuve & Sampson LLP

(57) ABSTRACT

Techniques are described which simplify and/or automate many of the tasks associated with the configuration, deployment, and management of network resources to support cloud-based services.

24 Claims, 14 Drawing Sheets

U.S. PATENT DOCUMENTS

| | | | |
|---|---|---|---|
| 2006/0010425 A1* | 1/2006 | Willadsen et al. | 717/120 |
| 2006/0052896 A1* | 3/2006 | Woehler | 700/107 |
| 2009/0276771 A1* | 11/2009 | Nickolov et al. | 717/177 |
| 2010/0250744 A1* | 9/2010 | Hadad et al. | 709/226 |
| 2010/0332617 A1* | 12/2010 | Goodwin et al. | 709/219 |
| 2011/0022561 A1* | 1/2011 | Birdwell et al. | 706/47 |
| 2011/0029981 A1* | 2/2011 | Jaisinghani | 718/104 |
| 2011/0055377 A1* | 3/2011 | Dehaan | 709/224 |
| 2011/0185063 A1* | 7/2011 | Head et al. | 709/226 |
| 2011/0185064 A1* | 7/2011 | Head et al. | 709/226 |
| 2011/0295999 A1* | 12/2011 | Ferris et al. | 709/224 |
| 2011/0296023 A1* | 12/2011 | Ferris et al. | 709/226 |
| 2011/0302003 A1* | 12/2011 | Shirish et al. | 705/7.38 |
| 2012/0022856 A1* | 1/2012 | Prompt et al. | 704/9 |
| 2012/0054345 A1* | 3/2012 | Sahu et al. | 709/226 |
| 2012/0089951 A1* | 4/2012 | Cassidy | 715/854 |
| 2012/0096389 A1* | 4/2012 | Flam et al. | 715/777 |
| 2012/0102180 A1* | 4/2012 | Jaisinghani | 709/223 |
| 2012/0124211 A1* | 5/2012 | Kampas et al. | 709/226 |
| 2012/0131594 A1* | 5/2012 | Morgan | 718/105 |
| 2012/0134355 A1 | 5/2012 | Vendrow | |
| 2012/0144364 A1* | 6/2012 | Lau et al. | 717/103 |
| 2012/0204068 A1* | 8/2012 | Ye et al. | 714/57 |
| 2012/0216131 A1* | 8/2012 | Moyers et al. | 715/757 |
| 2012/0253869 A1* | 10/2012 | Ansley | 705/7.12 |
| 2012/0271594 A1* | 10/2012 | Yan et al. | 702/183 |
| 2012/0284316 A1* | 11/2012 | Klinker et al. | 707/822 |

OTHER PUBLICATIONS

US Notice of Allowance mailed Nov. 6, 2012, issued in U.S. Appl. No. 13/418,181.

\* cited by examiner

RingCentral
YOUR PHONE SYSTEM, EVERYWHERE

Welcome, admin
Change password | Logout

RingCentral ADS > Environments

| Environments | Templates | Resources | Logs | Users |

List of Environments

Filter
Name: 
Type: All
State: All
Status: All

[Filter]

[Add Environment]

| Name | Type | State | Status | |
|---|---|---|---|---|
| ads03BIL | qa | live | ok | |
| CommunicationSystem | production | notdeployed | ok | |
| deploy several components | qa | live | error | |
| dontdeploytest | production | notdeployed | ok | |
| dummy depl | qa | notdeployed | error | |
| EH tests | qa | live | ok | |
| NTS test01 | qa | notdeployed | error | |
| Test empty env | qa | notdeployed | ok | |

Events

Deployment snapshot for server qa-win53 was created
2012-03-02 18:36:09   User Action Deployment snapshot for server qa-win51 was created
2012-03-02 18:34:52   User Action Deployment snapshot for server qa-win53 was created
2012-03-02 18:33:16   User Action Deployment snapshot for server qa-test02-lin.dins was created
2012-03-02 18:31:50   User Action Deployment snapshot for server qa-test01 was created
2012-03-02 18:29:46   User Action Deploy of sws on server qa-win53 was finished unsuccessfully
2012-03-02 18:27:39   Deploying

RingCentral
*YOUR PHONE SYSTEM, EVERYWHERE*

RingCentral ADS > Environments > Environment CommunicationSystem > View by servers Welcome, admin
Change password 🔒 Logout

| Environments | Templates | Resources | Logs | Users |

Environment CommunicationSystem detail screen

ROOT NODE: [ Environment ▼ ]

INFO

COMMON LAYER
SERVERS

| Name | IP Address | OS | Provider | Capacity | Services | |
|---|---|---|---|---|---|---|
| N/A | | | Bare-Metal | Small | CDB Deployed version: N/A Configured version: 143 | 🔧 |
| N/A | | | dummy | Medium | GUD Deployed version: N/A Configured version: 143 | 🔧 |
| N/A | | | VM-Ware | Medium | MSS Deployed version: N/A Configured version: 143 | 🔧 |

POP1
POD1_UNIT 1
SERVERS

| Name | IP Address | OS | Provider | Capacity | Services | |
|---|---|---|---|---|---|---|
| N/A | | | VM-Ware | Small | ADB Deployed version: N/A Configured version: 143 | 🔧 |
| N/A | | | VM-Ware | Large | TAS Deployed version: N/A Configured version: 143 | 🔧 |

POD2_UNIT 1

Actions
🔄 Switch view
✏️ Edit
⊙ Deploy

Messenger
Deployment snapshot for server qa-win53 was created
2012-03-02 18:36:09   User Action
Deployment snapshot for server qa-win51 was created
2012-03-02 18:34:52   User Action
Deployment snapshot for server qa-win53 was created
2012-03-02 18:33:16   User Action
Deployment snapshot for server qa-test02-lin.dins was created
2012-03-02 18:31:50   User Action
Deployment snapshot for server qa-test01 was created
2012-03-02 18:29:46   User Action
Deployment snapshot for server qa-win53 was finished successfully
2012-03-02 18:27:36   Deploying

RingCentral
YOUR PHONE SYSTEM, EVERYWHERE

Welcome, admin
Change password | 🔒 Logout

RingCentral ADS > Servers

| Environments | Templates | Resources | Logs | Users |

Filter

Name: [        ]
IP Address: [        ]
OS: [All ▼]
Provider: [------ ▼]

[Filter]

List of Servers

[Add Server]

| Name | IP Address | OS | Provider | Priority | Environment | |
|---|---|---|---|---|---|---|
| ec0.compute-1.amazonaws.com | 1.8.7.2 | CentOS | vm-aws | n/a | | ❌ |
| fakevm2 | 1.9.5.8 | Win2k3 | vm-vmw | Normal | | ❌ |
| qa-win50 | 1.7.2.8 | Win2k3 | vm-vmw | Normal | | ❌ |
| qa-ads03 | 1.9.8.5 | Win2k3 | vm-vmw | Low | | ❌ |
| qa-ads02 | 8.7.2.8 | Win2k3 | vm-vmw | Low | | ❌ |
| ec1.compute-1.amazonaws.com | 9.9.8.5 | CentOS | vm-aws | n/a | | ❌ |
| fake-bm | 1.7.8.8 | Win2k3 | bm | Low | | ❌ |
| qa-win00 | 1.8.8.5 | Win2k3 | vm-vmw | Low | | ❌ |
| qa-win53 | 8.7.8.8 | Win2k3 | vm-vmw | Low | | ❌ |
| ec2.compute-1.amazonaws.com | 9.9.8.8 | CentOS | vm-aws | n/a | | ❌ |
| qa-test02-lin | 1.8.7.7 | CentOS | vm-vmw | Low | | ❌ |
| qa-test01 | 9.9.8.9 | CentOS | vm-vmw | High | | ❌ |
| ec3.compute-1.amazonaws.com | 1.7.7.7 | CentOS | vm-aws | Low | | ❌ |
| qa-win51 | 9.9.5.8 | Win2k3 | vm-vmw | Low | TAS_win50 | 🔒 |

Events

◀ ▶

Deploy of tas on server qa-win53: was
Finished unsuccessfully
2012-03-05 19:52:26 : Deploying Deploy of tas on server qa-win51: was
Finished unsuccessfully
2012-03-05 18:49:46 : Deploying Deploy of tas on server qa-test01: was
Finished unsuccessfully
2012-03-05 18:28:00 : Deploying Deploy of tas on server qa-win51: was
Finished unsuccessfully
2012-03-05 17:30:41 : Deploying Deploy of tas on server qa-test01: was
Finished unsuccessfully
2012-03-05 17:19:21 : Deploying Deploy of tas on server qa-win51: was
Finished unsuccessfully
2012-03-05 17:16:03 : Deploying

NETWORK RESOURCE DEPLOYMENT FOR CLOUD-BASED SERVICES

RELATED APPLICATION DATA

The present application is a continuation of and claims priority under 35 U.S.C. 120 to U.S. patent application Ser. No. 13/418,181 entitled Network Resource Deployment for Cloud-Based Services filed Mar. 12, 2012, the entire disclosure of which is incorporated herein by reference for all purposes.

BACKGROUND

The present invention relates to systems and methods for deploying network resources in heterogeneous network environments to support, for example, cloud-based services.

The term "cloud computing" refers to computing models for enabling ubiquitous, convenient, on-demand network access to a shared pool of configurable computing resources (e.g., networks, servers, storage, applications, and services). Cloud-based services are rapidly becoming the primary way in which services are provided to businesses and consumers over the Internet and the World Wide Web.

The predominant way in which such resources are configured, deployed, and managed today involves the manual configuration, deployment, and management of individual system resources. This may not present an issue when the number of resources is small, e.g., 5 or 10 servers. However, as a cloud-based service or suite of services scales to meet increased customer demand, e.g., hundreds or thousands of servers across multiple geographically distinct colocations, manual techniques become a serious bottleneck to the scalability and delivery of such services.

In addition, manual deployment of network resources requires a relatively high level of programming skill and a detailed knowledge of the current configuration of deployed resources and, due to the complexity of the tasks involved, often requires time consuming trial-and-error troubleshooting of resource components and parameters before deployment is successful. The level of professional skill and institutional knowledge required for such key activities also represents a single point of failure from a system perspective, e.g., when a key employee moves on. These are undesirable technical and economic barriers to the deployment of cloud-based services.

SUMMARY OF THE INVENTION

According to the present invention, methods, apparatus, systems, and computer program products are provided for deploying one or more network-based services in a network. According to various embodiments, one or more user interfaces configured to facilitate specification of at least a portion of a logical structure of an environment by a user are provided. The logical structure of the environment interrelates the one or more network-based services and one or more corresponding configurations. The one or more network services and the one or more configurations are to be implemented by one or more network resources and one or more software components. The one or more network resources are selected from a pool of available network resources. The one or more network resources are removed from the pool of available network resources. The one or more network resources are allocated to the environment with reference to the logical structure of the environment. The one or more network resources and the one or more software components are deployed to the network with reference to the logical structure of the environment, thereby enabling provision of the one or more services.

According to some embodiments, the one or more user interfaces are further configured to enable the user to initiate deployment of the environment, and allocation of the one or more network resources and the one or more software components occurs in response to the initiation of the deployment of the environment.

According to some embodiments, the one or more user interfaces are further configured to enable the user to initiate provision of the one or more services once the environment has been deployed even where one or more tests of the environment failed.

According to some embodiments, the one or more user interfaces are further configured to enable the user to initiate undeployment of the environment, and the one or more network resources are returned to the pool of available network resources in response to undeployment of the environment.

According to some embodiments, the one or more user interfaces are further configured to enable the user to initiate pausing of operation of the environment, and provision of the one or more services is stopped in conjunction with the pausing of the operation of the environment.

According to some embodiments, the environment includes an updated version of a previously deployed environment, the previously deployed environment having a plurality of end users associated therewith, and the one or more user interfaces are further configured to enable the user to initiate migration of a subset of the end users from the previously deployed environment to the environment without interrupting provision of the one or more services to the subset of the end users.

According to some embodiments, the pool of available network resources includes both actual and virtual computing resources, and the allocation and deployment of the one or more network resources is accomplished using the actual and virtual computing resources interchangeably.

According to some embodiments, the environment interrelates a plurality of the network resources and a plurality of the software components. The plurality of network resources are situated in a plurality of geographically distinct data centers, and the logical structure of the environment includes one or more logical groupings of the network resources or software components across the geographically distinct data centers.

According to some embodiments, the environment interrelates a plurality of the network resources and a plurality of the software components, and the plurality of network resources employ a plurality of different operating systems to provide the one or more services.

According to some embodiments, the one or more user interfaces are further configured to enable the user to select an environment template in which the user may specify the portion of the logical structure of the environment, the environment template specifying a remainder of the logical structure of the environment.

According to some embodiments, the one or more network resources by which the one or more network-based services and one or more configurations are implemented are modified.

A further understanding of the nature and advantages of the present invention may be realized by reference to the remaining portions of the specification and the drawings.

BRIEF DESCRIPTION OF THE DRAWINGS

FIGS. 6-13 are examples of the user interface screens of FIG. 5.

DETAILED DESCRIPTION OF SPECIFIC EMBODIMENTS

Figure 1:
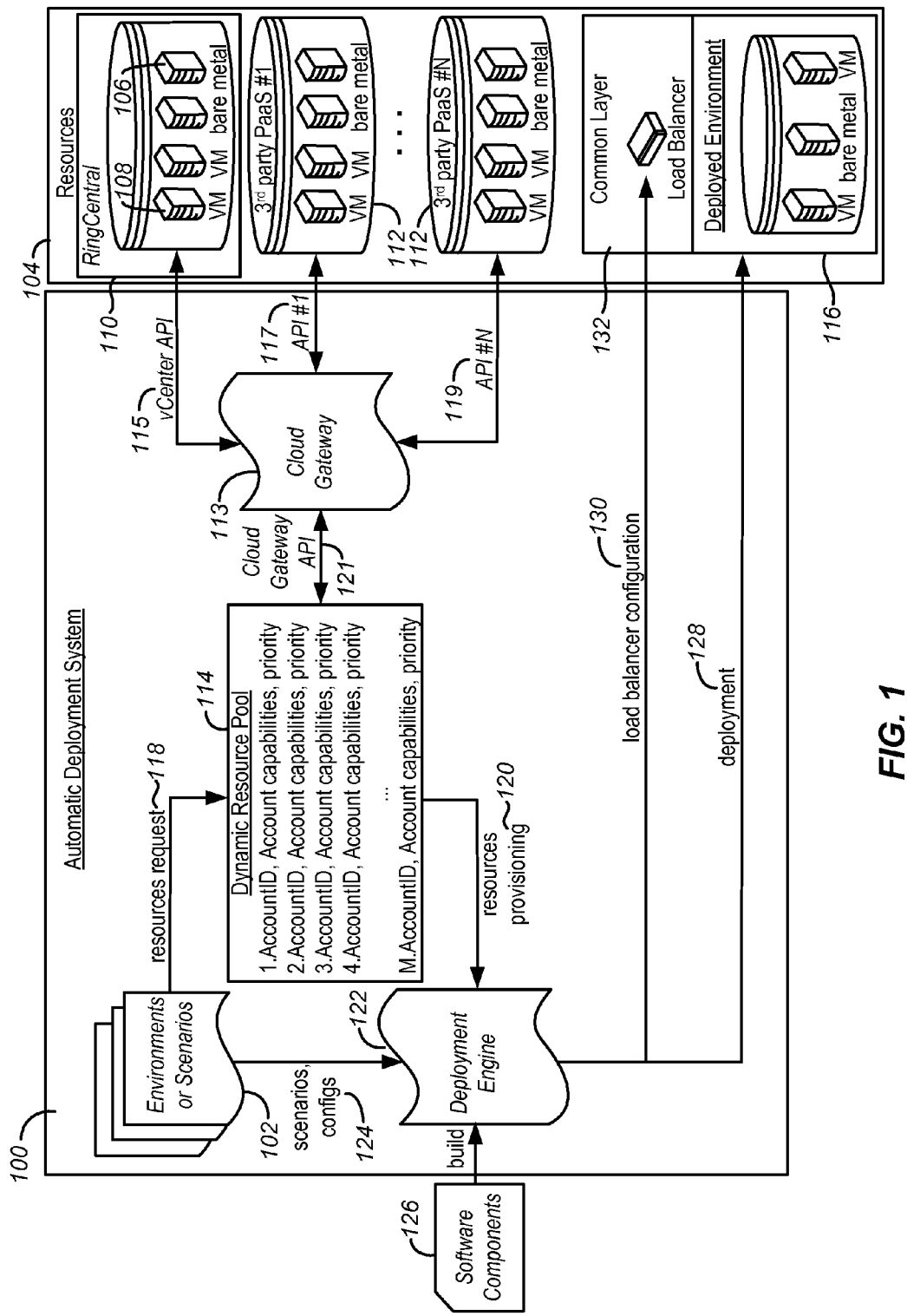
FIG. 1 is a simplified system diagram of a particular implementation of a deployment system.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention provide methods, apparatus, systems and computer program products which simplify and/or automate many of the tasks associated with the configuration, deployment, and management of network resources (including both computing resources and software) to support network services, e.g., cloud-based services. Such methods, systems and computer program products provide user interfaces that support the discovery, configuration, deployment, and management of network services and resources including, in some implementations, deployment of services and/or resources without interruption of currently operating systems and/or the delivery of services.

Various implementations are described herein in the context cloud-based communication services, e.g., telephony and fax services. However, it should be understood that the scope of the invention is much broader, encompassing a wide variety of systems and services provided using virtually any network-based computing paradigm. To be clear, the techniques described herein may be used to support any type of network or cloud-based service or set of services. Therefore, references to specific applications herein are not intended and should not be used to limit the scope of the invention.

The high-level architecture of a particular implementation of an Automatic Deployment System (ADS) capable of configuring, deploying, and managing network resources for a cloud-based service (e.g., a telephony service such as that described above) will now be described with reference to FIG. 1. It should be noted that the term "automatic" should not be interpreted to mean that deployment occurs without human interaction. Rather, it will become clear with reference to the description below that human involvement in the configuration, deployment and management of network services and/or resources is advantageously facilitated through the selective automation of various aspects of those tasks. And it is again worth noting that network services and/or resources may be configured, deployed, and managed for any type of service or system using a system like ADS 100.

The main object with which ADS 100 operates and the user interacts is referred to as an "environment." An environment 102 is a set of services, configurations, and dependencies, which may be implemented by software components and configuration files installed on resources. Resources 104 may include, for example, "bare metal" resources 106, e.g., actual computing hardware, as well as virtual resources, e.g., virtual machines (VMs) 108. These resources may be owned, associated with, or under control of different entities, e.g., resource pool 110 associated with communication service provider RingCentral, and resource pools 112 associated with third party platform-as-a-service (PaaS) providers #1 through #N. According to various implementations, multiple services may be installed on the same resource, and services can be transferred across resources without changing the logical structure of the environment.

Dependencies may include, for example, relationships between services, relationships between configurations, and relationships between services and configurations. For example, a telephony service may require a voicemail service, which could be expressed in a dependency. In another example, the configuration of a service may depend on the configuration of another service, such as a common directory shared between the services, which could be expressed in another dependency. In some implementations, services, configurations, and dependencies, as well as the corresponding software components, configuration files, and resources, may be expressed in static or dynamic Extensible Markup Language (XML) format, which would allow for the hierarchical and modular definition of environments.

Resources may interface with ADS 100 directly, or through cloud gateway 113, via various application programming interfaces (APIs). For example, "bare metal" resource 106 and virtual resource (VM) 108 may be abstracted or virtualized at a service provider level and may interface with ADS 100 directly, or through cloud gateway 113, via virtual center (vCenter) API 115. In another example, "bare metal" resource 106 and virtual resource 108 may interface with ADS 100 directly, or through cloud gateway 113, via separate APIs. Third party PaaS resources may interface with ADS 100 directly, or through cloud gateway 113, via various platform APIs 117, 119.

According to a particular implementation, cloud gateway includes a main module connected to ADS 100 via cloud gateway API 121 and one or more connector modules which work with the API(s) of particular resources (e.g., APIs 115, 117, 119). Cloud gateway API 121 provides a set of operations for resources which may be used by environments during their lifecycles. Examples of such operations may include, for example, creating, deleting, rebooting, getting the state of, starting, stopping, and creating or deleting a snapshot of a resource. Other examples of such operations may include getting a list of resources, getting sizes of resources (e.g., CPU, RAM or storage capacity), getting a list of instance templates, uploading instance templates, deleting instance templates, and getting a list of snapshots.

Dynamic resource pool 114 identifies all of the resources among resources 104 that are available for inclusion in any new or existing environment. Dynamic resource pool 114 provides a view of resources which is agnostic to the underlying software and hardware resources. Note that dynamic resource pool 114 may include information about whether or not a resource has been deployed, e.g., in deployed environment 116, or whether a resource is available, partially available, or unavailable. Dynamic resource pool 114 can also contain aggregate information about resources, such as, for example, the number of small, medium, and large servers available for deployment.

According to some implementations, the ADS may periodically request a list of available resources, or a list of changes in available resources, from resource pools, for example, using the cloud gateway API 121 or APIs connecting to resource pools (e.g., APIs 115, 117, 119), and automatically update the list of available resources (e.g., dynamic resource pool 114). Alternatively, or in addition, the resource pools can notify the ADS of changes in resources, for example, through the cloud gateway using various APIs (e.g., APIs 115, 117, 119).

When a user of the ADS wishes to deploy a new environment or new resources to an existing environment, a resource request 118 is generated to dynamic resource pool 114, in response to which appropriate resources are provisioned 120 and identified to deployment engine 122. According to some implementations, if dynamic resource pool 114 does not include sufficient resources to fulfill the resource request, resources may be generated on the fly, e.g., new VMs may be instantiated. That is, dynamic resource pool 114 may be a dynamic pool of resources in which resources may be added in response to demand. This can be particularly advantageous from a cost perspective where third party PaaS resources are used in that they may be created and deployed as needed. More specifically, resources may be added, deleted, or modified based on determinations by the resource pools or based on determinations by the ADS. For example, if a given resource pool is approaching load capacity, it may provision additional servers and notify the ADS of those servers. In another example, if the ADS determines that particular services are performing slower than expected, ADS could request additional resources and shift those services to those new resources.

According to a particular implementation, deployment engine 122 employs the open-source integration tool Chef as a foundation. Chef from Opscode is open source software under the Apache license 2.0 and provides a systems integration framework that facilitates configuration management of network infrastructure. Chef uses "cookbooks" or "recipes" to enable management of network resources by writing code rather than running commands. Chef also uses "libraries" to enable integration of network resources with applications, databases, LDAP directories, etc. For more information regarding Chef, please refer to http://www.opscode.com/chef/.

Conventionally used, Chef requires highly specialized knowledge and programming skills to manually configure and manage network resources. An ADS implemented as described herein provides one or more additional layers of abstraction and functionality on top of the Chef framework which allow a higher degree of automation in the configuration, deployment, and management of network resources without requiring the specialized knowledge or programming skills of the typical Chef user. This, in turn, enables cloud-based services and systems to be highly scalable, eliminating a critical bottleneck in meeting rapidly increasing demand. It should be noted that Chef is merely one example of a systems integration framework upon which implementations of an ADS may be built. Others examples include Puppet Enterprise and AutomateIt.

Referring back to FIG. 1, the user specifies scenarios (i.e., one or more services) and/or configurations for the requested resources and requests deployment. Scenarios and/or configurations 124 include specifications of what services and configurations will be used in a deployment, as well as any dependencies between them, all of which may be implemented as software components and configuration files installed on resources. Deployment engine 122 receives the scenarios/configurations 124, the provisioned resources 120, and any software components 126 to be integrated with the resources, and deploys the environment 128. Software components 126 might correspond, for example, to any of the various aspects of the services being deployed on the network resources, such as installation packages, programs, or scripts, and configuration files (including dependencies). Deployment engine 122 then verifies that the deployment was correct and successful, and once verified, changes the environment status from "not deployed" to "deployed," or possibly even "live." In the implementation shown, deployment engine 122 also provides a load balancer configuration 130 to common layer 132. Common layer 132 may correspond, for example, to a set of resources that is shared by multiple environments.

According to some implementations, ADS 100 supports "continuous integration," i.e., the configuration, deployment, and/or management of network resources and software components without interruption of services. This may be accomplished, for example, by migrating services and users from one environment to another, i.e., "hot swapping" a currently active environment with an updated version of that environment.

Figure 2:
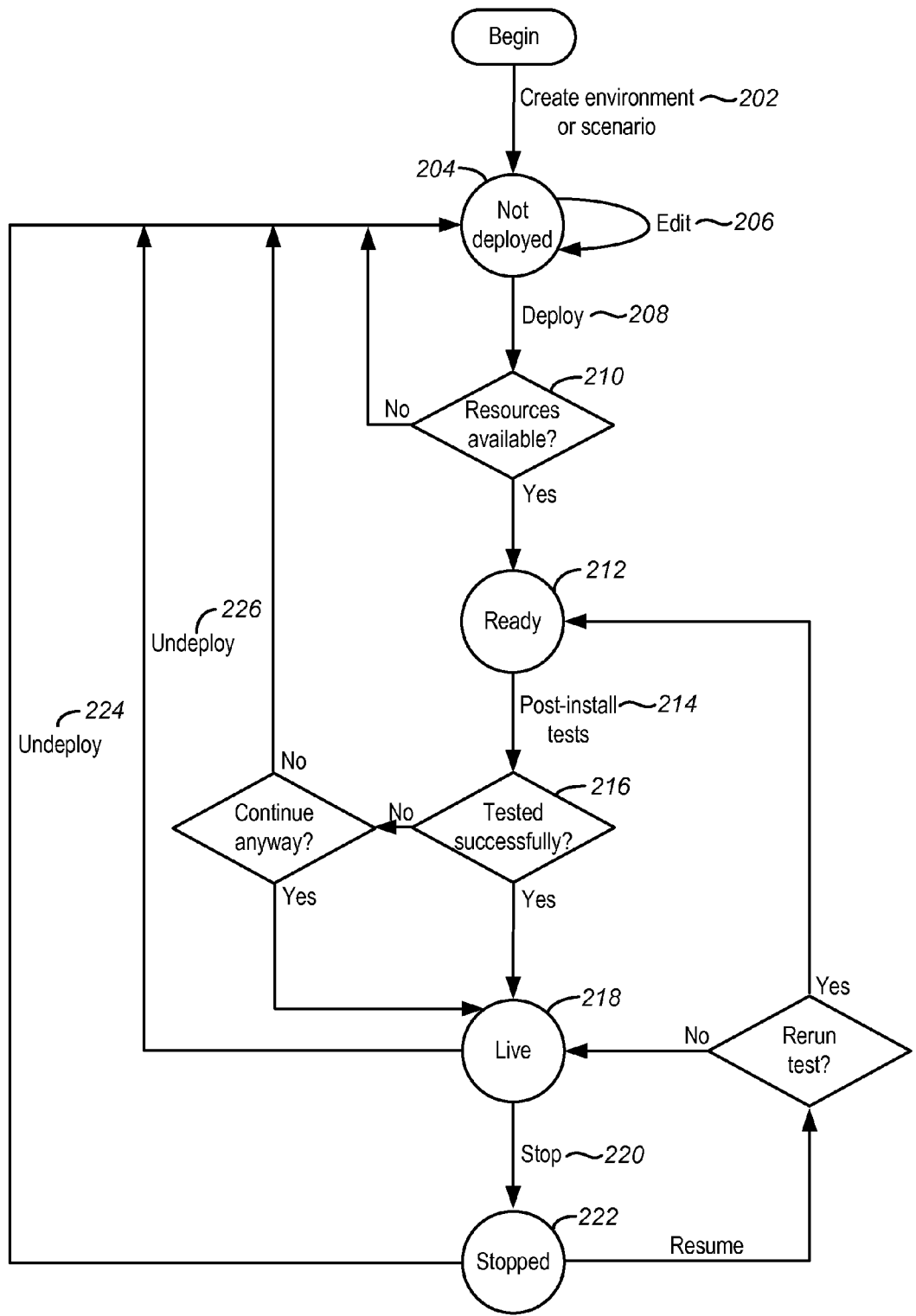
FIG. 2 is a flowchart illustrating the lifecycle of an environment or scenario configured, deployed and managed by a particular implementation of a deployment system.

The flowchart of FIG. 2 illustrates the lifecycle of an environment or one or more services (i.e., referred to herein as a scenario) according to a particular implementation of the ADS. The user creates an environment or scenario from scratch, from a template, or by cloning it from one of the existing environments (202). According to a particular implementation, the user may choose between a fixed deployment or an auto deployment. If fixed deployment is chosen, the user may specify any part of the environment or scenario, e.g., services, configurations, dependencies, software components, resources, software component to resource mappings, etc. If auto deployment is chosen, the ADS will specify some or all of these parts of the environment or scenario, e.g., based on existing services, configurations, dependencies (e.g., software component dependencies), available resources, etc. At this point, the environment or scenario is in the "not deployed" state (204).

In the "not deployed" state the environment or scenario can be edited (206) until the user wishes to deploy it. In response to a "deploy" request (208), the ADS checks the dynamic resource pool for necessary resources (210), and locks them for use. If insufficient resources are available, the ADS reports this to the user and returns the environment or scenario to the "not deployed" state (204). Alternatively, or in addition, the system could initiate the creation of additional resources, or resource pools could initiate the creation of additional resources in response to requests by the ADS. If, on the other hand, the ADS has all necessary resources the deployment process begins, at which point the ADS activates the deployed environment or scenario ("ready" state 212) and runs all necessary post-install tests 214. If the post-install tests are successful (216) the deployed environment or scenario may be used and its state is changed to the "live" state (218) in which it becomes operational and is used for its target purpose, e.g., to provide cloud-based services. Otherwise, the ADS reports the test failure(s) to the user and may return the environment or scenario to the "not deployed" state (204).

Alternatively, there may be circumstances in which, even though the post-install tests are not entirely successful, the user may still want to allow the environment or scenario to go live. For example, during the testing phase of a particular environment or scenario configuration it may be useful to allow test engineers the flexibility to have an environment or scenario go live even though some of the post-install tests may have failed.

If the user wants to stop operation of the environment or scenario (220), the state of the environment or scenario becomes "stopped" (222). This may be useful where, for example, an environment or scenario employs third party resources which, when operating, represent cost, i.e., when the resources of an environment or scenario are not being utilized, operation of the environment or scenario may be paused. This state may have various implications for the underlying network resources. For example, the operation of "bare metal" servers in a deployed environment or scenario might not literally be stopped, but might instead take one of three states, e.g., "ready," "live," or "not deployed." By contrast, for VMs, the ADS might run a shutdown procedure that saves images of the VMs to storage.

If the user wants to modify a live environment or scenario in some way (e.g., change software component versions or configurations, add or change resources, etc.), the ADS undeploys the environment or scenario (224) and returns it to the "not deployed" state (204). Similarly, if a live environment or scenario is no longer needed it may be undeployed (224). When a deployed environment or scenario is undeployed (224 or 226), the ADS deletes all saved images of VMs registered for the environment or scenario, releases and/or reformats all "bare metal" servers registered for the environment or scenario, and returns all resources to the dynamic resource pool.

An environment or scenario may also be returned to the "ready" state (212), e.g., for rerunning post-install tests, or to the "live" state (218), e.g., to resume normal operation.

Figure 3:
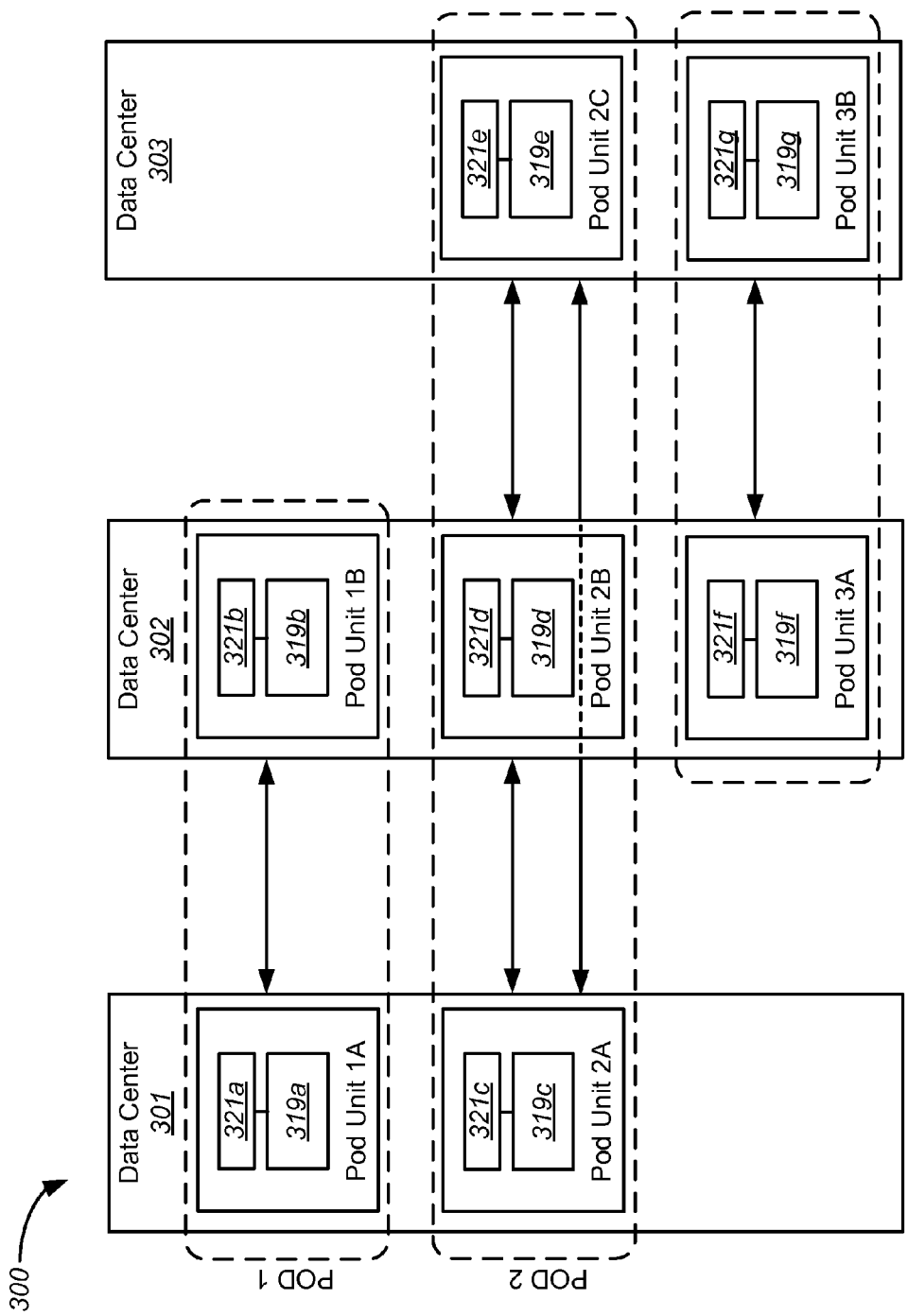
FIGS. 3 and 4 are simplified block diagrams of an example of a communication system in which network resources may be deployed using a particular implementation of a deployment system.
Figure 4:
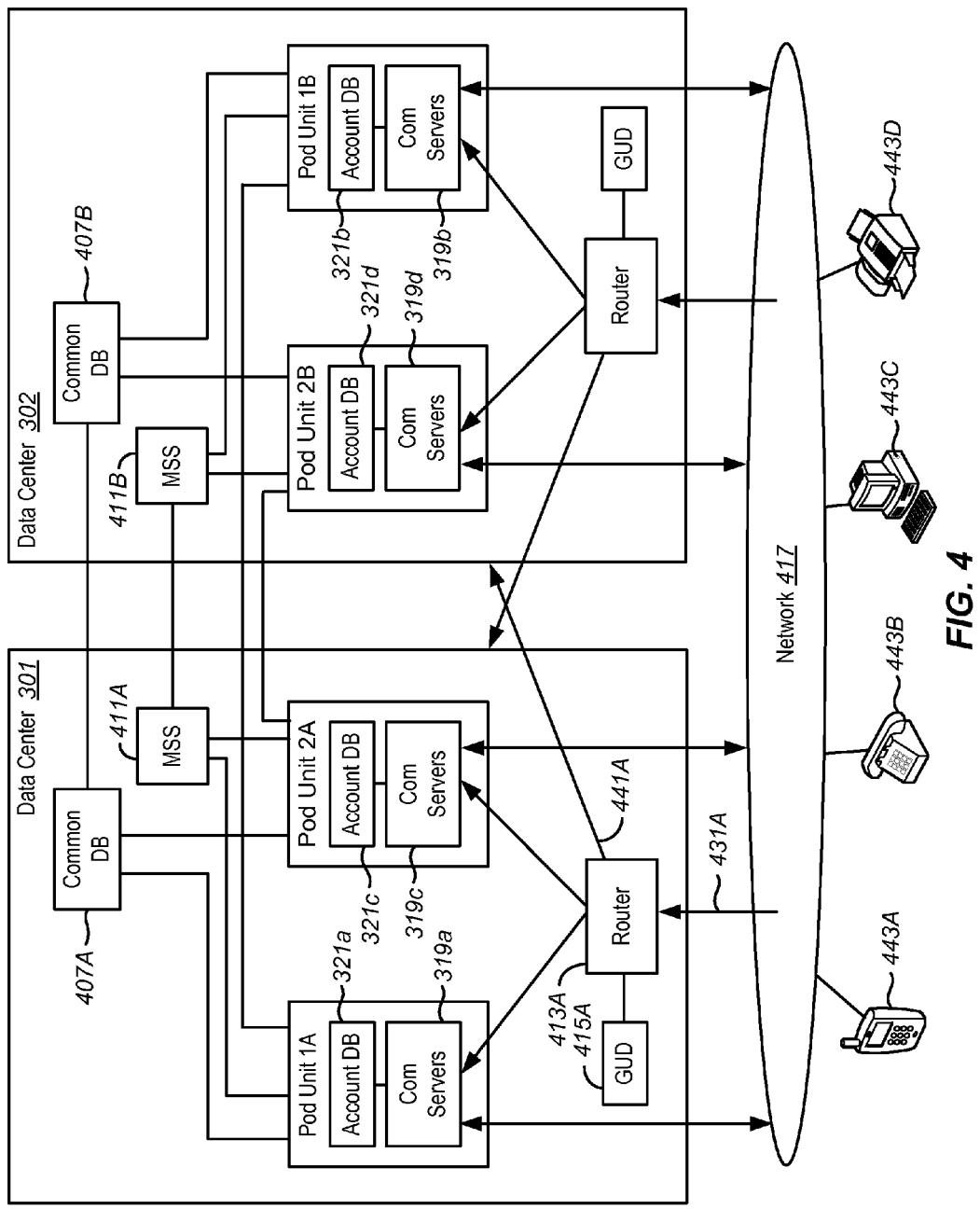

According to a particular implementation, an ADS is customized to facilitate deployment of network resources in a cloud-based communication system such as the one illustrated in FIGS. 3 and 4. FIG. 3 shows a communication system 300 which can be, for example, a cloud-based telephony system. Communication system 300 includes data centers 301, 302, and 303. Each data center is a point of presence (POP) that includes the network resources (e.g., servers, routers, switches, network connections, etc.) necessary to support the services provided by communication system 300. Each data center is typically located in a different geographical region.

In this example, communication system 300 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 319a-319g configured to provide substantially the same services to the same subset of users as the other pod units within the same pod. Each pod unit also includes an account database 321a-321g configured to support the respective communication servers for the corresponding subset of users.

FIG. 4 shows various components of communication system 300 of FIG. 3. Specifically, FIG. 4 shows the various interconnections within and between data centers 301 and 302. Both data centers are in communication with network 417. Service requests from various communication devices 443A-443D are routed through network 417 to either or both of the data centers. Data center 301 includes pod units 1A and 2A, a common database (CDB) 407A, a message storage system (MSS) 411A, a router 413A, and a global user directory (GUD) 415A. Additional pod units (not shown) may also be included in data center 301. Data center 302 is similarly configured and includes components that operate substantially the same as those in data center 301. Data centers 301 and 302 provide backup and redundancy to one another in the event of failure.

Communication servers 319 provide telecommunication services (e.g., voice, video, email, and/or facsimile) to corresponding subsets of users. Each server 319 may also provide other services including, for example, user account management and configuration, billing services, accounting services, etc. Each pod unit includes an account database 321 to support the communication server(s) for that particular pod unit, storing configuration details and other information regarding each user's account.

Pod units 1A and 1B are in communication with one another so that the data on their respective account databases are synchronized across data centers. Data center 301 includes router 413A to receive an incoming service request 431A from network 417. Router 413A parses the incoming service request to identify or extract a user key and queries GUD 415A to determine which pod is associated with the user key. Once the associated pod has been identified router 413A routes the service request to the pod unit in the data center associated with the identified pod. If the pod unit associated with the identified pod is not associated with data center 301, router 413A may route the service request to another data center (e.g., data center 302 as indicated by the arrow 441A).

Each pod unit of the data center 301 is also coupled to MSS 411A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 411A are synchronized with other data centers (e.g., synchronized with MSS 411B of data center 302).

Each pod unit in data center 301 is coupled to common database 407A which stores shared data for all of the pods, and stores consolidated information from account databases 321. Common database 407A also facilitates changes to the pod databases. For example, common database 407A may store data for applications that provide the services on communication servers 319. Different versions of the applications data may be stored in common database 407A which allow changes and upgrades to communication servers 319 to be implemented efficiently and conveniently. Changes may be made to common database 407A and propagated to pod units 1A and 2A. Common database 407A is synchronized across data centers to other common databases (e.g., common database 407B of data center 302). Common database 407A, MSS 411A, router 413A, and GUD 415A form a common layer of resources that are shared by all pod units in data center 301.

For more information regarding the nature of such a system with which an ADS constructed as described herein may be used, please refer to U.S. patent application Ser. No. 12/957, 125 entitled User Partitioning in a Communication System filed on Nov. 30, 2010, the entire disclosure of which is incorporated herein by reference for all purposes.

According to some implementations, the logical structure of an environment (e.g., specified using XML, dynamic XML, databases, graphical design environments, etc.) may be fixed to varying degrees (from the user's perspective) to facilitate the configuration, deployment, and management of a particular type of system or service set such as the communication system described above. In such implementations, the user's options in specifying or selecting elements of the structure may be constrained to achieve a desired level of uniformity of the environments deployed. For example, the use of XML to define the logical structure of the environment allows the user to define a hierarchical and modular configuration of services and configurations, which may be easily stored, versioned, and updated in a source code repository. An example of the logical structure of an environment and deployment information similar to those discussed above with reference to FIGS. 3 and 4 is illustrated in Tables 1-7 below in which the various levels of an environment hierarchy are defined.

Environment

TABLE 1

| | |
|---|---|
| Attributes | ID :== Unique unsigned integer<br>Name :== String<br>Type :== [Pro \| Custom \| Dev]<br>Subtype :== [QA \| AppDev \| StressTests] # only if Type == Dev, else empty<br>CDB IDs :== Array of TNS # links to DBs in Common Layer |
| Downlinks | POD quantity :== Unsigned Integer # not 0<br>PODs :== Array of used PODs # elements are POD IDs |

Pod (Point of Data)

TABLE 2

| | |
|---|---|
| Attributes | ID :== Unique unsigned integer<br>Name :== String # from preconfigured list |
| Downlinks | UNITs :== Array of UNIT IDs # at least two elements |

Unit

TABLE 3

| | |
|---|---|
| Attributes | ID :== <POD ID>[1 \| 2]<br>Location :== String # POP name, preconfigured<br>State :== [Active \| Standby] # Boolean<br>Database ID :== TNS of ADB |
| Downlinks | Roles :== Hash of used Service Roles |

Service Role

TABLE 4

| | |
|---|---|
| Attributes | ID :== <POD ID><UNIT ID><Integer><br>Role Name :== String<br>Role Description :== String<br>Load Balancer using :== Boolean |
| Downlinks | Software Components :== Array of used RingCentral Software Components # elements are software ID. |

Ring Central Software Component

TABLE 5

| | |
|---|---|
| Attributes | ID :== Integer<br>Name :== String<br>Major version :== Integer<br>Minor version :== Integer<br>Branch ID :== Integer<br>Branch Name :== String<br>Commit number :== Integer<br>OS compatability :== [Win2K \| Win2K3 \| Win2K8 \| RHEL \| CentOS]<br>Configuration :== Hash<br>Number :== Integer # Number of this component in Service Role |
| Downlinks | Server ID :== Integer # ServerID in Dynamic Resource Pool |

TABLE 5-continued

| | |
|---|---|
| | Major dependencies :== Array of RingCentral Software Components # elements are RingCentral Software Components IDs<br>Minor dependencies :== Array of 3rd party Software Components # elements are RingCentral Software Components IDs |

Third Party Software Component

TABLE 6

| | |
|---|---|
| Attributes | ID :== Integer<br>Name :== String<br>Major version :== Integer<br>Minor version :== Integer<br>Configuration :== Hash |

Server

TABLE 7

| | |
|---|---|
| Attributes | ID :== Integer # ServerID in Dynamic Resource Pool<br>Name :== String # Hostname<br>Domain :== String # DNS right part<br>IP :== IP address<br>OS :== [Win2K \| Win2K3 \| Win2K8 \| RHEL \| CentOS]<br>Virtual mark :== Boolean<br>Virtualization API type :== [VMWARE \| AWS ] # only if Virtual mark is TRUE, else empty<br>Size :== [small \| medium \| large ] # server power indicator<br>Priority :== Integer |

According to other implementations, the structure of an environment may itself be specified using the ADS. Such implementations would allow an ADS to be customizable so that it might be used to configure, deploy, and manage network resources for a wider variety of different types of services and systems.

Figure 5:
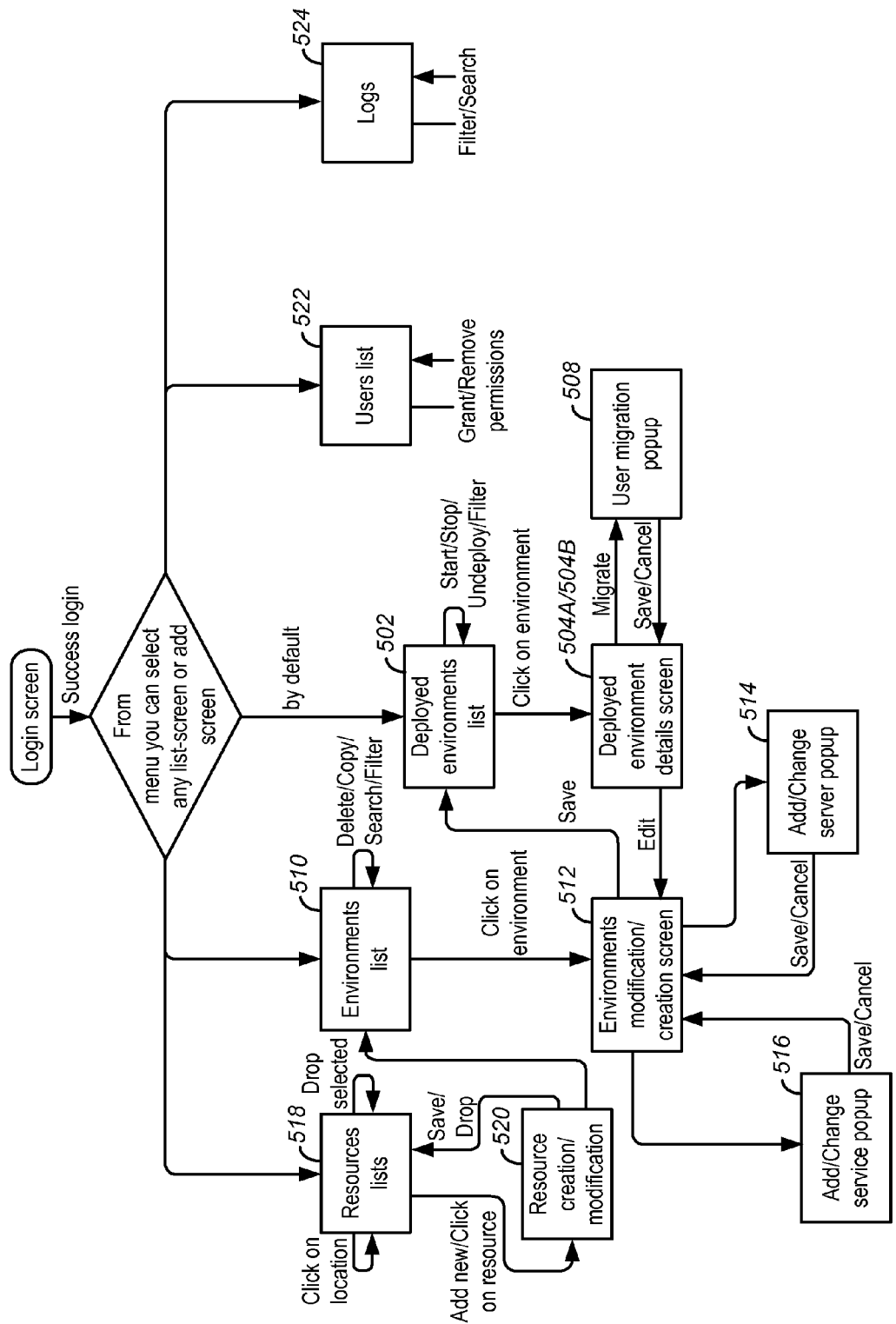
FIG. 5 is a diagram illustrating the relationship among user interface screens of a particular implementation of a deployment system.

FIG. 5 is a flow diagram illustrating the relationship among user interface screens of an ADS that enables configuration, deployment, and management of environments of a cloud-based communication system such as the one described above with reference to FIGS. 3-4 and Tables 1-7. FIGS. 6-13 provide examples of the UI screens and the options presented to the user. Note that, with the exception of the login screen, a user can reach any list or add screen from the navigation menu shown at the right of several of the interfaces. Also note that a deployment sequence initiated using such interfaces can be asynchronous for a service or group of services, and can be synchronous between services or among a defined group of services.

According to some implementations, the sequence by which services or groups of services are be deployed may be specified in the ADS using a deployment configuration file, ADS database, or similar data structure. For example, a deployment configuration file may specify that common layer services are deployed synchronously prior to user-specific services such as message services, but the message services are deployed asynchronously with respect to each other. In another example, a deployment configuration file may define groups of services that can be deployed asynchronously with respect to the services in each group, as well as a sequence for the groups of services to be deployed synchronously.

In the depicted implementation, when a user logs in, the default screen is the Deployed Environments List screen 502 shown in FIG. 6 in which environments in various stages of the environment lifecycle (e.g., see FIG. 2) are listed. Various action options are available to the user for the listed environments depending on the current state of each including, for example, deploy, stop, undeploy, etc.

Figure 7:
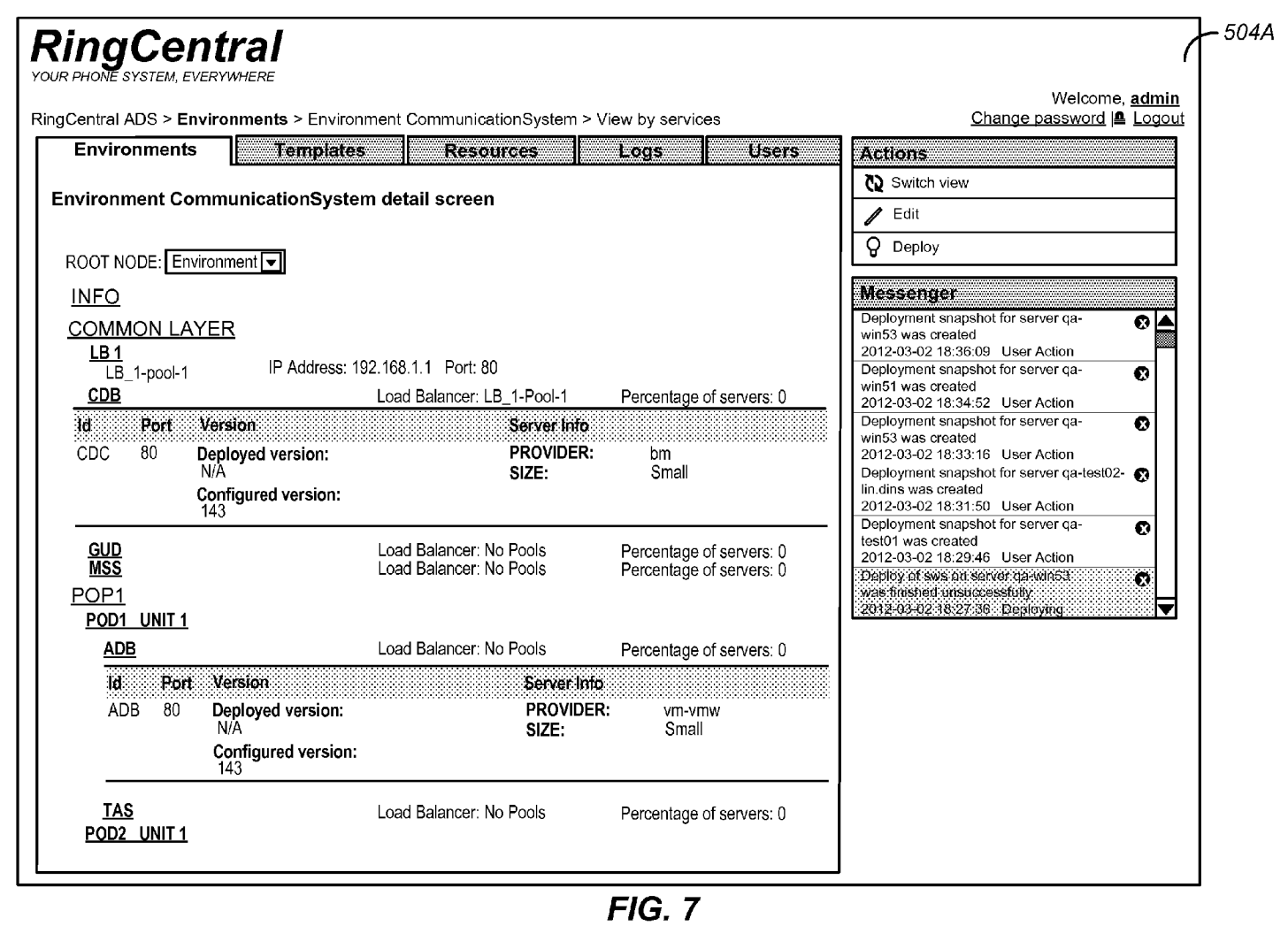

A Deployed Environments Details screen 504A shown in FIG. 7 is reached by selecting one of the listed environments. The logical structure of the environment is shown, i.e., data centers (POPs), pods, pod units, etc., including the services associated with each pod unit. An alternative view is provided in screen 504B of FIG. 8 in which the servers associated with each pod unit are displayed instead of the services. A variety of user actions are available for various levels of the logical hierarchy including the ability to set databases to read only, start or stop a particular resource, to activate or deactivate a portion of the structure, or to migrate users, e.g., from one pod unit in a pod to another.

A variety of actions are also available at the environment level to change the state of the environment including, for example, updating or editing the environment, various types of deployment of the environment (e.g., live or off-line), starting or stopping the environment (including scheduling of starts and stops), undeployment of an environment, etc. One environment-level option enables the migration of users from one environment to another which might be used, for example, when an environment needs to be taken offline or replaced by an updated or otherwise modified version. This allows such actions to be taken without interruption of service to the affected users.

Figure 9:
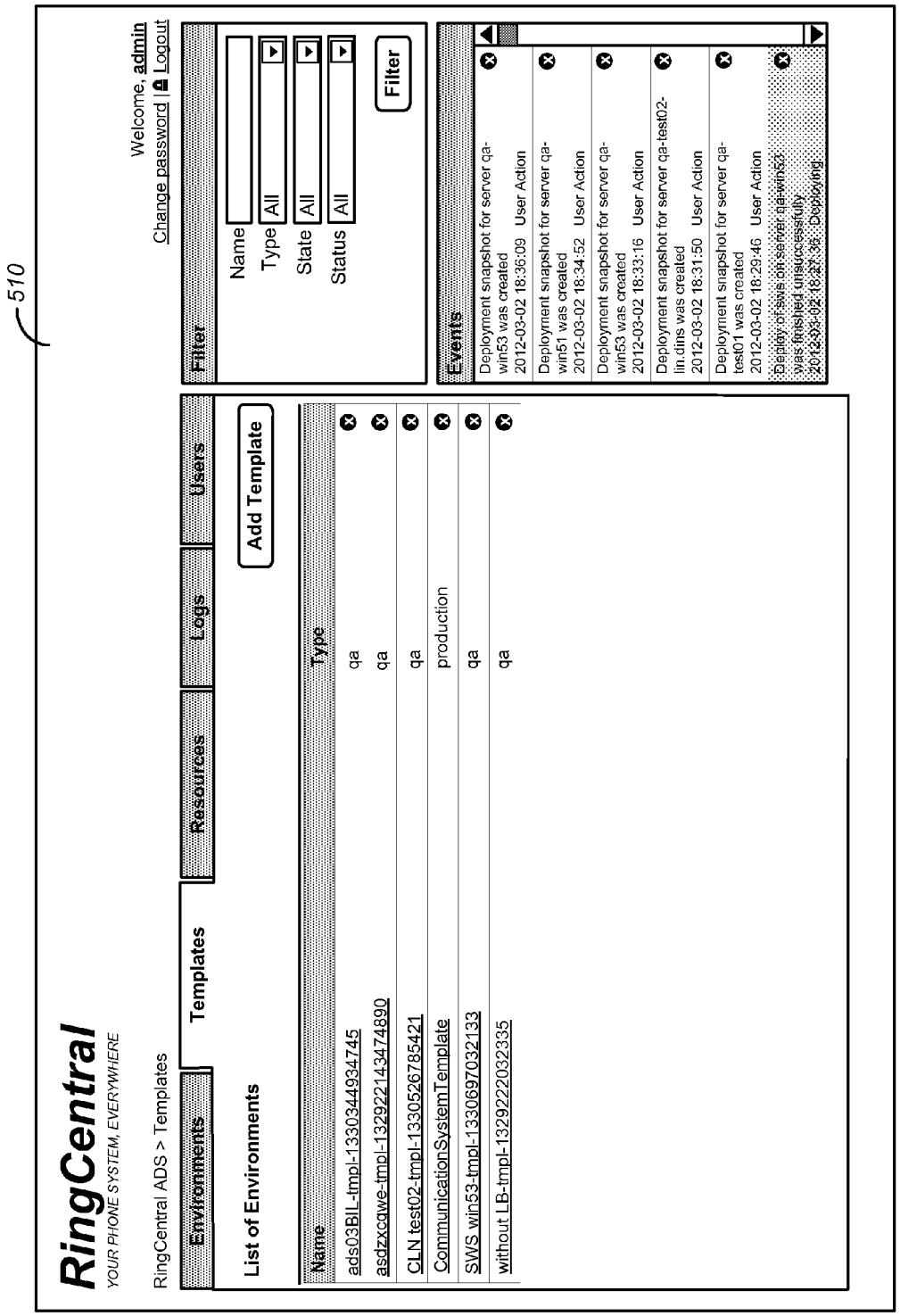
Figure 10:
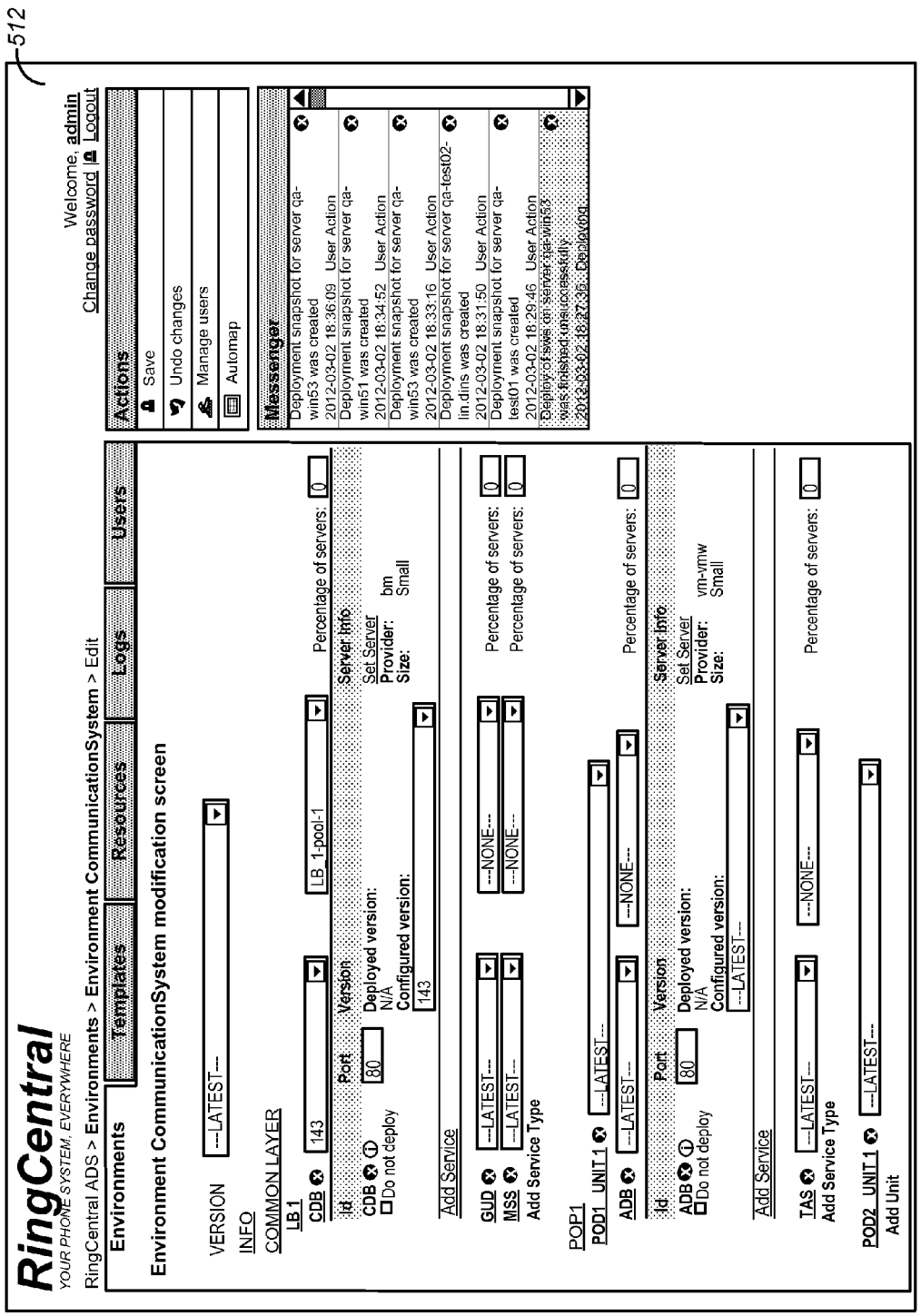

Environment Templates List screen 510 of FIG. 9 provides the user with a list of available template environments (i.e., templates) from which a new environment may be created and configured. Selection of one of the templates results in presentation of Environment Modification screen 512 of FIG. 10 in which the user may create a new environment. The user may also reach this screen to modify an existing environment by selecting, for example, the "edit" option in the Deployed Environment Details screens 504A and 504B discussed above with reference to FIGS. 7 and 8.

Add Service Popup screen 516 by which the user may select a service to add to the environment is presented in response to selection of the add service type options in screen 512. Add/Change Server Popup screen 514 is presented in response to the selection of the set server option in screen 512, and allows the user to add servers from among a list of available "bare metal" and virtual servers, the list of which may be filtered by different attributes, such server type or size. According to the implementation shown, the logical structure of the selected template or environment is relatively fixed with the user's options being largely constrained to adding pod units to a pod and services to a pod unit (including specification of a load balancing pool). In other implementations, the user may modify any part of the logical structure of the selected template or environment, which can then be saved as a new template or environment.

Resources List screen 518 of FIG. 11 provides a view to the user of all available resources in the dynamic resource pool (e.g., dynamic resource pool 114 of FIG. 1). Both "bare metal" and virtual resources may be added to the pool using Resource Creation/Modification screen 520 which may be reached by selecting "Add new" or a particular one of the existing resources in screen 518. A locations list can be used to filter the list of available resources based on the physical locations of resources.

Figure 12:
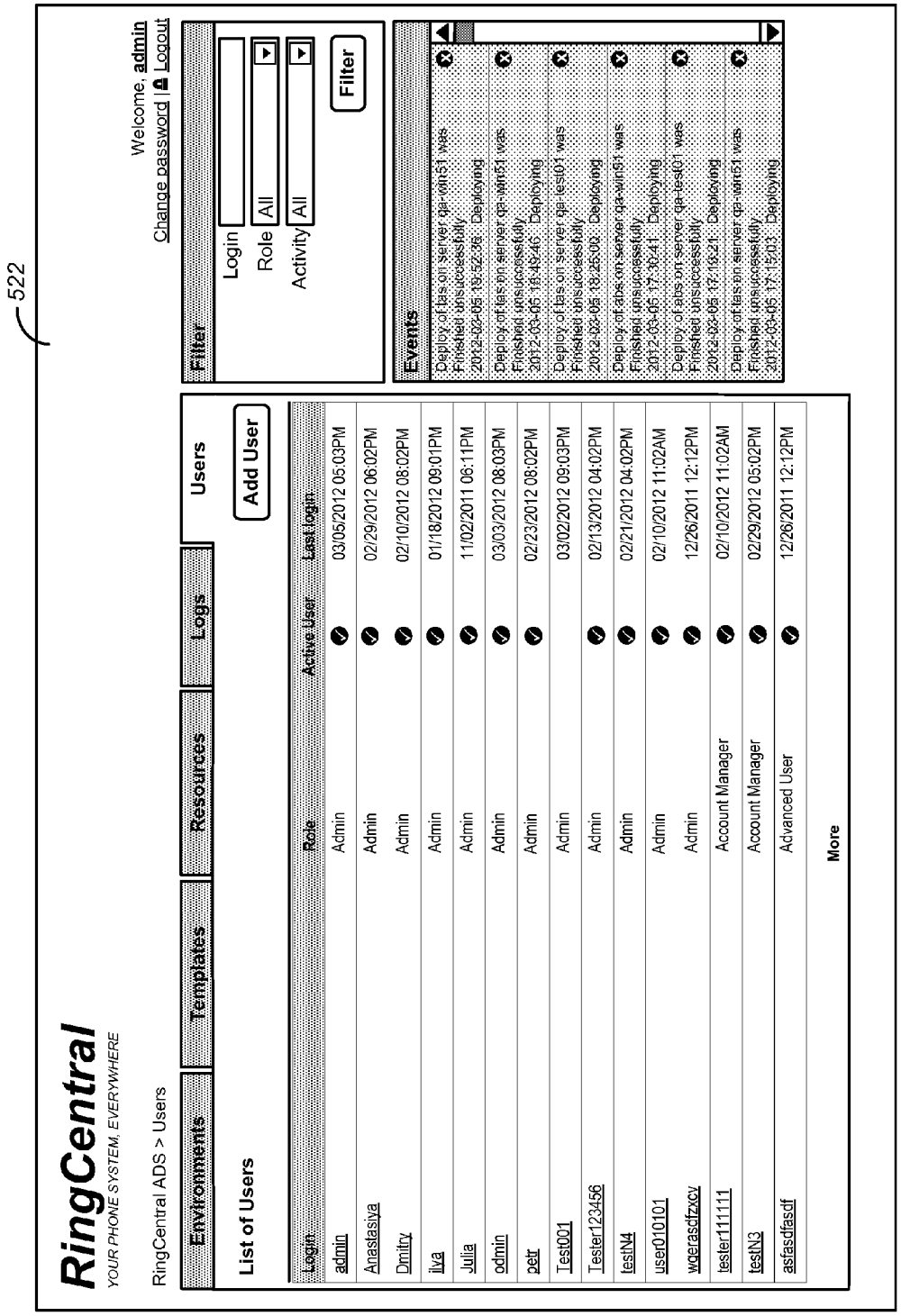

Users List screen 522 of FIG. 12 facilitates management of user permissions for users authorized to configure, deploy, and manage environments and network resources using an ADS and, in particular, allows an authorized user to grant, remove or modify permissions to create environments on a user-specific basis.

Figure 13:
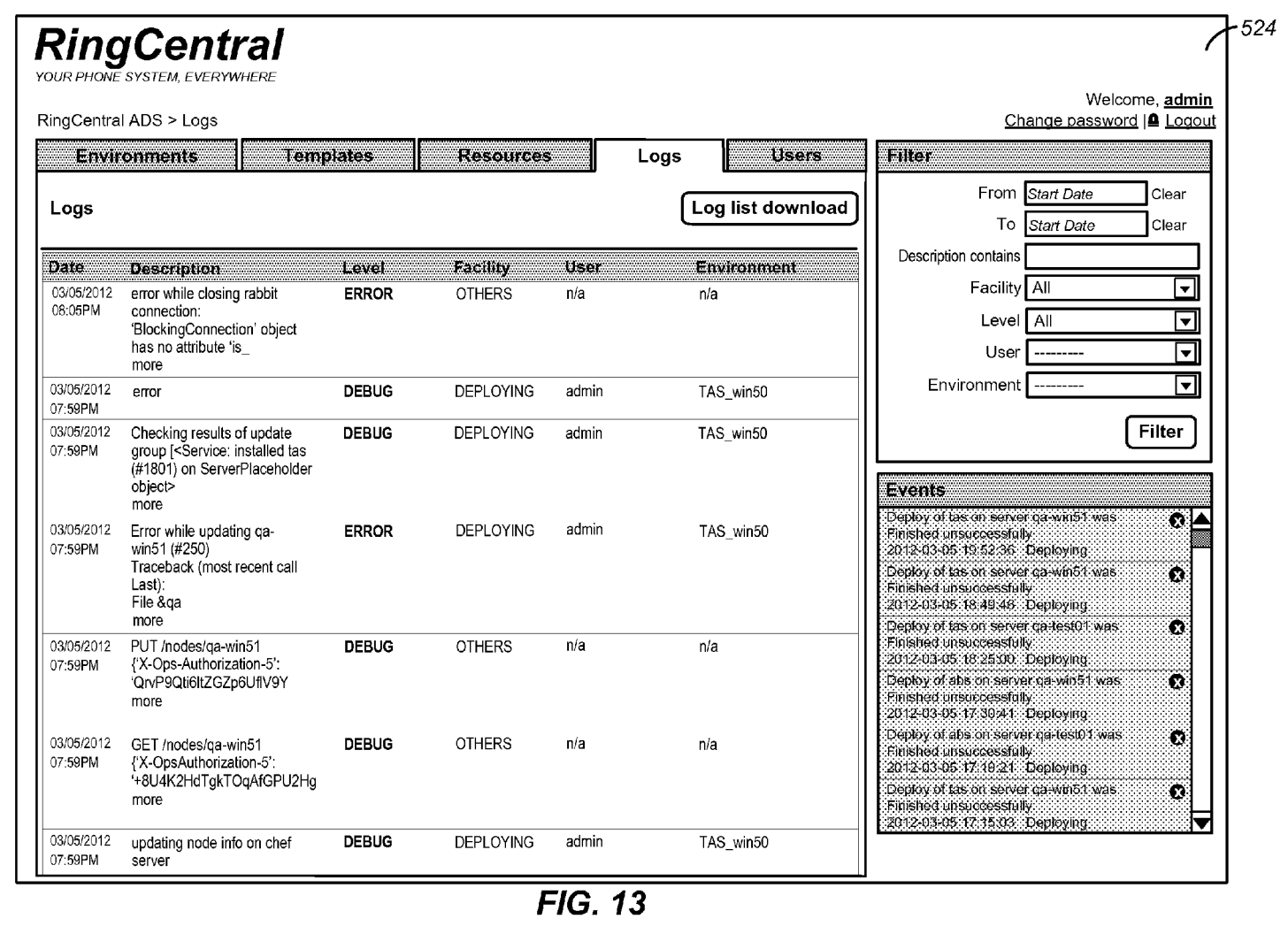

ADS Logs screen 524 of FIG. 13 provides a view to the user of events associated with various environments organized, in this example, by time. The user may search or filter the log entries by description, date (e.g., by specifying a window of time), event level (e.g., debug, info, warning, error, critical), user, or environment. This enables the user to reduce the log entries to only those of interest.

Figure 14:
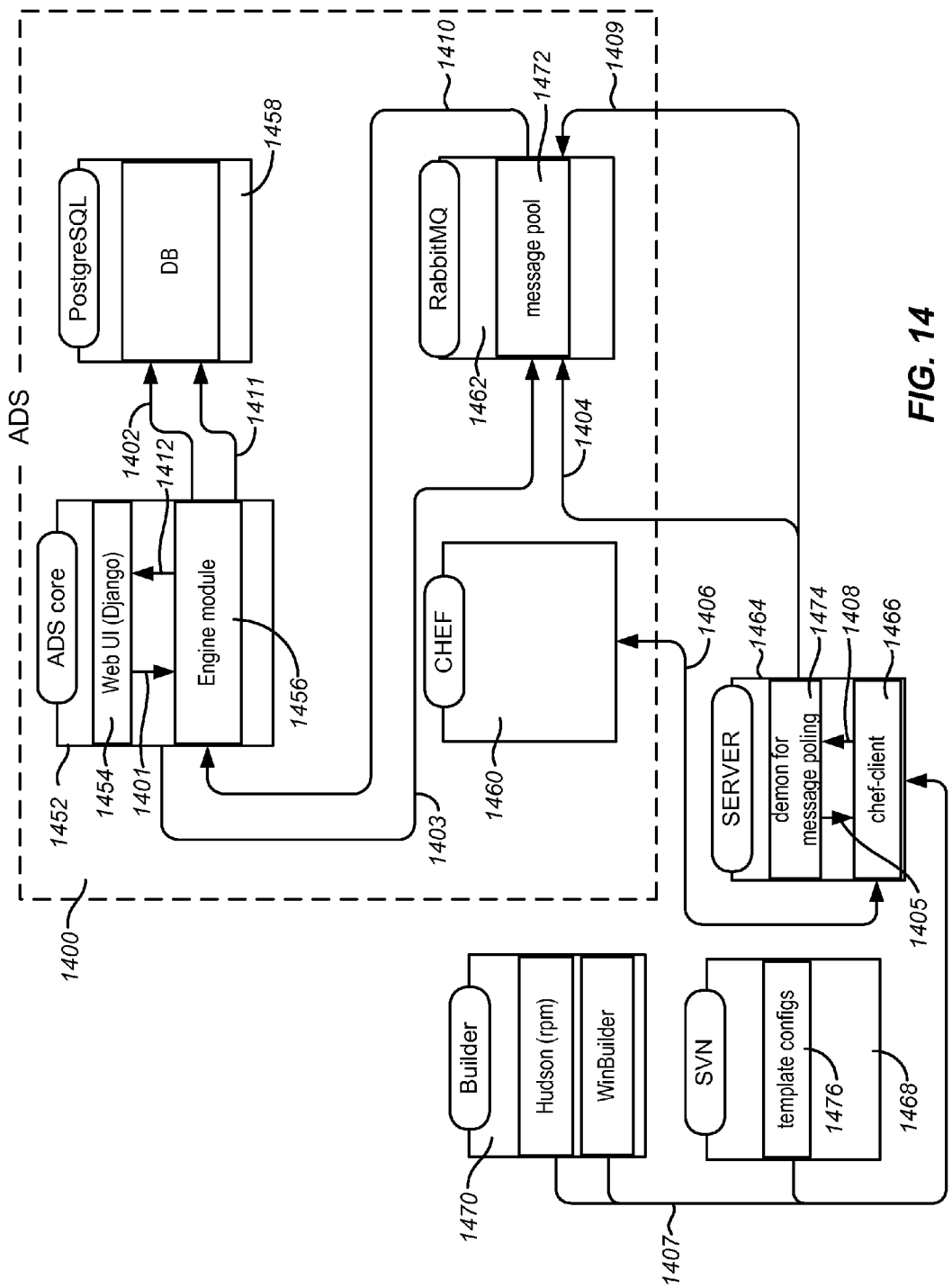
FIG. 14 is a simplified system diagram of a particular implementation of a deployment system.

FIG. 14 illustrates the manner in which information flows according to a particular implementation of an ADS 1400. One or more ADS core servers 1452 employ a Web user interface 1454 to enable user interaction with ADS engine 1456. In the example shown, Web UI 1454 is based on Django, an open source web application framework written in Python. UI 1454 may be configured, for example, to provide user interfaces such as those discussed above with reference to FIGS. 5-13.

One or more ADS data stores 1458 are PostgreSQL systems, object-relational management systems used for storing data used by ADS 1400 (e.g., environments configurations, users, etc.), as well as jobs run by ADS 1400. As discussed above, ADS 1400 includes one or more Chef servers 1460 to support deployment of environments. ADS 1400 also includes one or more RabbitMQ servers 1462 to support message exchange, e.g., between ADS core server 1452 and other servers in the system. One or more Chef client servers 1464 instantiate and run chef clients 1466 which are responsible for retrieving environment templates from Apache Subversion (SVN) server(s) 1468 and software components, such as installation packages, programs, or scripts from Builder server(s) 1470.

According to some implementations, an ADS may be designed for high availability. For example, separate ADS instances may be used to configure, deploy and manage different types of environments, e.g., test environments, preproduction environments, and production environments. Redundancy of system components within an ADS (e.g., ADS core servers, ADS data stores, Chef servers, RabbitMQ servers, etc.) may be supported using, for example, the Common Address Redundancy Protocol (CARP) and distributed storage, e.g., using Distributed Replicated Block Devices (DRBDs) or Network-attached Storage (NAS). A wide variety of other high availability design techniques may be used to ensure the desired level of reliability and availability.

Referring once again to FIG. 14, a query (1401), e.g., with the configuration of an environment, is transmitted from UI 1454 to ADS engine 1456 which queries data store 1458 for the state of the environment (1402). ADS core server 1452 also queries RabbitMQ server 1462 for creating a pool of messages (1403). Message pool 1472 polls demon 1474 on Chef client server 1464 (1404) which starts chef client 1466 on the Chef client server (1405). Chef client 1466 retrieves the role and cookbook or recipe from Chef server 1460 (1406). Chef client 1466 also retrieves software components from Builder server 1470 and environment template configurations 1476 from SVN server 1468 (1407). An exit status is returned from Chef client 1466 to demon 1474 (1408), which places the exit status on the message bus of RabbitMQ server 1462 (1409). The exit status message is then returned to ADS engine 1456 (1410), written into data store 1458 (1411), and returned to UI 1454 (1412).

As mentioned above, an ADS designed as described herein may be used to configure, deploy, and manage network resources in a variety of homogeneous and heterogeneous network contexts to support wide variety of systems and network-based services including, for example, cloud-based systems and services. It follows then that the scope of the invention is not limited to any particular type of network or network topology, or to particular types or configurations of computing devices. This is true with respect to the nature of the network and computing devices in which and onto which systems and services are configured, deployed, and managed with an ADS, as well as the network and computing devices in and on which the ADS operates to facilitate the configuration, deployment, and management of network resources to support such systems and services.

And despite references to particular computing paradigms and software tools herein, the computer program instructions with which embodiments of the invention may be implemented may correspond to any of a wide variety of programming languages and software tools, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for managing one or more network-based services in a network, comprising:
    deploying one or more network resources and one or more software components to the network to implement the one or more network-based services using a logical structure specifying an environment for providing the network based services, the logical structure interrelating the one or more network-based services and one or more corresponding configurations, the logical structure being organized in a hierarchy having a plurality of levels, each level of the hierarchy comprising one or more modular components, the logical structure including dependencies among the modular components; and
    in response to a command to modify operation of at least one of the one or more modular components corresponding to a particular level of the hierarchy, modifying operation of a corresponding subset of the one or more network resources and the one or more software components in accordance with the dependencies.

2. The computer-implemented method of claim 1, wherein deploying the one or more network resources and the one or more software components to the network to implement the one or more network-based services comprises effecting deployment in a specified sequence.

3. The computer-implemented method of claim 2, wherein the specified sequence specifies either or both of a first group of services to be deployed asynchronously relative to each other, or a second group of services to be deployed synchronously relative to each other.

4. The computer-implemented method of claim 1, wherein the command to modify operation of the at least one of the one or more modular components comprises a command to start or stop operation of a server, a software component, a service, a group of services, or the environment.

5. The computer-implemented method of claim 1, wherein the command to modify operation of the at least one of the one or more modular components is a command to stop operation of the at least one of the one or more modular components, the method further comprising, in response to a command to replace the at least one of the one or more modular components with an updated version of the at least one of the one or more modular components, modifying the logical structure of the environment to include the updated version.

6. The computer-implemented method of claim 5 further comprising, allocating one or more new network resources or one or more new software components for the updated version of the at least one of the one or more modular components.

7. The computer-implemented method of claim 1 further comprising, starting or stopping operation of a particular one of the network resources or a particular one of the software components in response to a command to start or stop operation of the particular one of the network resources or the particular one of the software components.

8. The computer-implemented method of claim 1, wherein the command to modify operation of the at least one of the one or more modular components comprises a command to stop operation of the at least one of the one or more modular components, the method further comprising migrating a population of users from the at least one of the one or more modular components to a different instance of the at least one of the one or more modular components.

9. A system for managing one or more network-based services in a network, the system comprising one or more computing devices configured to:
    store a logical structure specifying an environment for providing the network based services, the logical structure interrelating the one or more network-based services and one or more corresponding configurations, the logical structure being organized in a hierarchy having a plurality of levels, each level of the hierarchy comprising one or more modular components, the logical structure including dependencies among the modular components;
    deploy one or more network resources and one or more software components to the network to implement the one or more network-based services using the logical structure; and
    in response to a command to modify operation of at least one of the one or more modular components corresponding to a particular level of the hierarchy, modify operation of a corresponding subset of the one or more network resources and the one or more software components in accordance with the dependencies.

10. The system of claim 9, wherein the one or more computing devices are configured to deploy the one or more network resources and the one or more software components to the network to implement the one or more network-based services by effecting deployment in a specified sequence.

11. The system of claim 10, wherein the specified sequence specifies either or both of a first group of services to be deployed asynchronously relative to each other, or a second group of services to be deployed synchronously relative to each other.

12. The system of claim 9, wherein the command to modify operation of the at least one of the one or more modular components comprises a command to start or stop operation of a server, a software component, a service, a group of services, or the environment.

13. The system of claim 9, wherein the command to modify operation of the at least one of the one or more modular components is a command to stop operation of the at least one of the one or more modular components, the one or more computing devices further being configured to, in response to a command to replace the at least one of the one or more modular components with an updated version of the at least one of the one or more modular components, modify the logical structure of the environment to include the updated version.

14. The system method of claim 13, wherein the one or more computing devices are further configured to allocate one or more new network resources or one or more new software components for the updated version of the at least one of the one or more modular components.

15. The system of claim 9, wherein the one or more computing devices are further configured to start or stop operation of a particular one of the network resources or a particular one of the software components in response to a command to start or stop operation of the particular one of the network resources or the particular one of the software components.

16. The system of claim 9, wherein the command to modify operation of the at least one of the one or more modular components comprises a command to stop operation of the at least one of the one or more modular components, the one or more computing devices further being configured to migrate a population of users from the at least one of the one or more modular components to a different instance of the at least one of the one or more modular components.

17. A computer program product for managing one or more network-based services in a network, the computer program product comprising one or more non-transitory computer-readable media having computer program instructions stored therein, the computer program instructions being configured such that, when executed by one or more computing devices, the computer program instructions cause the one or more computing devices to:
    deploy one or more network resources and one or more software components to the network to implement the one or more network-based services using a logical structure specifying an environment for providing the network based services, the logical structure interrelating the one or more network-based services and one or more corresponding configurations, the logical structure being organized in a hierarchy having a plurality of levels, each level of the hierarchy comprising one or more modular components, the logical structure including dependencies among the modular components; and
    in response to a command to modify operation of at least one of the one or more modular components corresponding to a particular level of the hierarchy, modify operation of a corresponding subset of the one or more network resources and the one or more software components in accordance with the dependencies.

18. The computer program product of claim 17, wherein the computer program instructions are further configured to cause the one or more computing devices to deploy the one or more network resources and the one or more software components to the network to implement the one or more network-based services by effecting deployment in a specified sequence.

19. The computer program product of claim 18, wherein the specified sequence specifies either or both of a first group of services to be deployed asynchronously relative to each other, or a second group of services to be deployed synchronously relative to each other.

20. The computer program product of claim 17, wherein the command to modify operation of the at least one of the one or more modular components comprises a command to start or stop operation of a server, a software component, a service, a group of services, or the environment.

21. The computer program product of claim 17, wherein the command to modify operation of the at least one of the one or more modular components is a command to stop operation of the at least one of the one or more modular components, the computer program instructions being further configured to cause the one or more computing devices to, in response to a command to replace the at least one of the one or more modular components with an updated version of the at least one of the one or more modular components, modify the logical structure of the environment to include the updated version.

22. The computer program product of claim 21, wherein the computer program instructions are further configured to cause the one or more computing devices to allocate one or more new network resources or one or more new software components for the updated version of the at least one of the one or more modular components.

23. The computer program product of claim 17, wherein the computer program instructions are further configured to cause the one or more computing devices to start or stop operation of a particular one of the network resources or a particular one of the software components in response to a command to start or stop operation of the particular one of the network resources or the particular one of the software components.

24. The computer program product of claim 17, wherein the command to modify operation of the at least one of the one or more modular components comprises a command to stop operation of the at least one of the one or more modular components, the computer program instructions being further configured to cause the one or more computing devices to migrate a population of users from the at least one of the one or more modular components to a different instance of the at least one of the one or more modular components.

* * * * *